US010301692B2

(12) United States Patent
Terajima et al.

(10) Patent No.: US 10,301,692 B2
(45) Date of Patent: May 28, 2019

(54) WELDING METHOD AND WELD STRUCTURE

(71) Applicant: NETUREN CO., LTD., Tokyo (JP)

(72) Inventors: Akira Terajima, Tokyo (JP); Kazuhiro Kawasaki, Tokyo (JP); Fumiaki Ikuta, Tokyo (JP); Yasuyuki Koyata, Tokyo (JP); Yoshitaka Misaka, Tokyo (JP)

(73) Assignee: NETUREN CO., LTD., Tokyo (JP)

( * ) Notice: Subject to any disclaimer, the term of this patent is extended or adjusted under 35 U.S.C. 154(b) by 120 days.

(21) Appl. No.: 14/848,807

(22) Filed: Sep. 9, 2015

(65) Prior Publication Data

US 2016/0076117 A1    Mar. 17, 2016

(30) Foreign Application Priority Data

Sep. 11, 2014  (JP) ................................. 2014-185747

(51) Int. Cl.
*B23K 11/11*   (2006.01)
*C21D 1/18*    (2006.01)
(Continued)

(52) U.S. Cl.
CPC .............. *C21D 1/18* (2013.01); *B23K 11/115* (2013.01); *B23K 11/24* (2013.01); *B23K 11/25* (2013.01);
(Continued)

(58) Field of Classification Search
CPC ....... B23K 11/11; B23K 11/16; B23K 11/166; B23K 11/115
(Continued)

(56) References Cited

U.S. PATENT DOCUMENTS 4,732,026 A * 3/1988 Ban ................... B21D 51/2676
                                                    219/64
4,925,500 A * 5/1990 Kishida ................ C21D 8/0226
                                                    148/332
(Continued)

FOREIGN PATENT DOCUMENTS

EP    2 474 381    7/2012
EP    2 769 797    8/2014
(Continued)

OTHER PUBLICATIONS

Extended European Search Report for EP Appl. No. 15186577.1 dated Apr. 25, 2016.
(Continued)

*Primary Examiner* — Dana Ross
*Assistant Examiner* — Ayub A Maye
(74) *Attorney, Agent, or Firm* — Greenblum & Bernstein, P.L.C.

(57) ABSTRACT

Object of the present invention is to provide a welding method prevented the fracture at the spot welding zone by recovering the strength of a spot welding zone, namely, the ductility and the toughness in the spot welding zone, and a weld structure manufactured by the method. In the welding method, a spot welding zone provided with a weld nugget 13a is formed by conducting spot welding on the heat treated steel sheets in a stack; the spot welding zone is tempering treated by the high-frequency electrical current application to make the weld nugget have a hardness of 150% or less of the hardness of the heat treated steel sheets, and the heat affected zone surrounding the weld nugget is made to have a hardness of 30% to 90% of the hardness at the weld nugget before the tempering treatment by the high-frequency electrical current application.

4 Claims, 13 Drawing Sheets

(51) Int. Cl.
*C21D 6/00* (2006.01)
*C22C 38/04* (2006.01)
*C22C 38/02* (2006.01)
*C22C 38/00* (2006.01)
*B23K 11/24* (2006.01)
*B23K 11/25* (2006.01)
*C21D 9/50* (2006.01)
*B23K 101/18* (2006.01)
*B23K 103/04* (2006.01)

(52) U.S. Cl.
CPC ............ *C21D 6/005* (2013.01); *C21D 6/008* (2013.01); *C21D 9/50* (2013.01); *C22C 38/002* (2013.01); *C22C 38/02* (2013.01); *C22C 38/04* (2013.01); *B23K 2101/18* (2018.08); *B23K 2103/04* (2018.08)

(58) Field of Classification Search
USPC .............. 219/86.1, 86.31, 91.2, 91.22, 91.23
See application file for complete search history.

(56) References Cited

U.S. PATENT DOCUMENTS

| | | | | |
|---|---|---|---|---|
| 7,118,809 | B2* | 10/2006 | Utsumi | C21D 8/00 427/433 |
| 7,829,202 | B2* | 11/2010 | Ishikawa | B23K 9/02 148/525 |
| 8,962,149 | B2* | 2/2015 | Oikawa | B23K 11/115 428/594 |
| 2003/0221752 | A1* | 12/2003 | Utsumi | C22C 38/02 148/334 |
| 2005/0167402 | A1 | 8/2005 | Takahashi et al. | |
| 2007/0138239 | A1* | 6/2007 | Kumagai | B23K 20/1235 228/227 |
| 2011/0008648 | A1* | 1/2011 | Okitsu | B23K 9/23 428/683 |
| 2011/0303655 | A1* | 12/2011 | Kanai | B23K 11/115 219/660 |
| 2012/0129006 | A1 | 5/2012 | Kanai et al. | |
| 2014/0251961 | A1* | 9/2014 | Karagoulis | B23K 11/241 219/91.2 |
| 2014/0305912 | A1* | 10/2014 | Taniguchi | B23K 11/24 219/91.22 |
| 2015/0053655 | A1* | 2/2015 | Sigler | B23K 11/20 219/91.22 |
| 2015/0217396 | A1 | 8/2015 | Okada et al. | |

FOREIGN PATENT DOCUMENTS

| | | |
|---|---|---|
| EP | 2014/148341 | 9/2014 |
| EP | 2 977 138 | 1/2016 |
| JP | 2005-211934 | 8/2005 |
| JP | 4006513 | 11/2007 |
| JP | 2007-332457 | 12/2007 |
| WO | 2011/013793 | 2/2011 |

OTHER PUBLICATIONS

Masao Hayakawa et al., "Characterization of Microstructure for Tempered Martensite by Atomic Force Microscopy", Materia Japan, vol. 43, No. 9 (2004), pp. 717-723, including partial English-language translation thereof.

* cited by examiner

Fig. 5
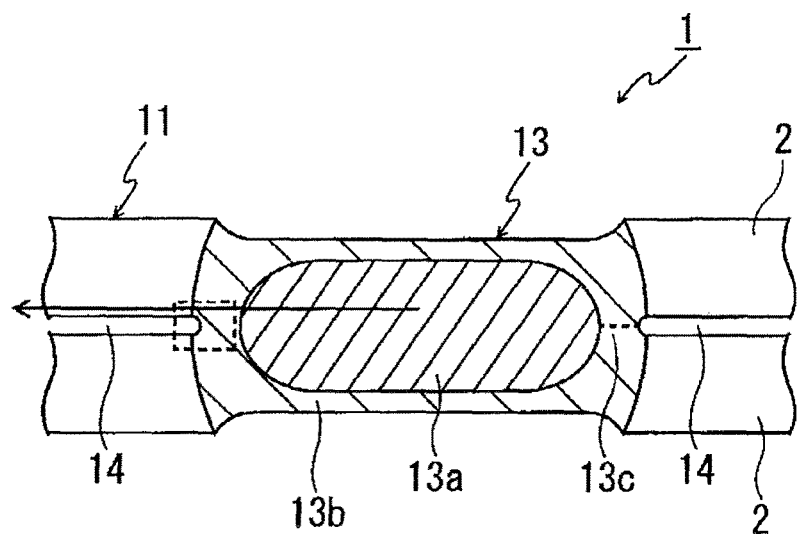
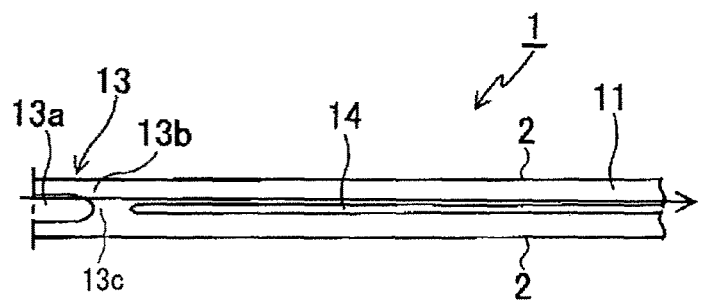
FIG. 6 (a)
FIG. 6 (b)
Hardness
Distance from Center of Naget

FIG. 10

| | | | Comparative Example 1 | Example 1 | Comparative Example 2 | Example 2 | Comparative Example 3 | Example 3 |
|---|---|---|---|---|---|---|---|---|
| | | | Steel Plate of 1.95 GPa | | Steel Plate of 1.31 GPa | | Steel Plate of 0.77GPa | |
| | | | Just Low-Freq. | Post Hi-Freq. Application | Just Low-Freq. | Post Hi-Freq. Application | Just Low-Freq. | Post Hi-Freq. Application |
| Nugget View | Top View | Nugget |  |  |  |  |  |  |
| | | Opposite |  |  |  | 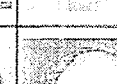 |  |  |
| 5mm | Side View (Nugget) | |  |  |  |  |  |  |
| Fracture Load [kN] Fracture Mode *2 | 1st. | | 2.42 × | 7.37 ○ | 2.86 × | 8.49 ○ | 1.15 × | 5.54 ○ |
| | 2nd. | | 1.49 × | 7.56 ○ | 2.25 × | 8.15 ○ | 1.24 × | 5.90 ○ |
| | 3rd. | | 1.90 × | 7.71 ○ | 2.73 × | 8.10 ○ | 1.26 × | 5.76 ○ |
| | Ave. | | 1.94 | 7.55 | 2.61 | 8.24 | 1.21 | 5.73 |
| | R | | 0.93 | 0.34 | 0.61 | 0.39 | 0.11 | 0.36 |
| Fracture Load/outer peripheral [kN/mm] | | | 0.10 | 0.40 | 0.14 | 0.44 | 0.06 | 0.30 |

*2 Fracture modes: ○(Plug Fracture) ×(Partial Plug or interface Fracture)
*3 Outer Peripheral (Length) is determined from Nugget Diameter in Crosssection of Macropattern

WELDING METHOD AND WELD STRUCTURE

FIELD OF THE INVENTION

The present invention relates to a method of welding a plurality of steel sheets and a weld structure manufactured by the same.

BACKGROUND ART

A method of welding a plurality of steel sheets in a stack includes spot welding method. In the spot welding method, a plurality of steel sheets are stacked and sandwiched between a paired electrodes, and then electrical current is applied between the paired electrodes under pressure along the rods of the paired electrodes. The electrical current resistive-heats to melt the sandwiched portions in an area having a predetermined diameter and then the melted portions solidify, and thus a melted and solidified portion referred to as weld nugget is formed (Japanese Patent Laid-Open No. 2005-211934).

In recent years, steel sheets high in tensile strength have been used as the materials for body of automobiles, and steel sheets high in tensile strength is welded by spot welding to achieve both the weight reduction and the safety in automobiles. Two methods represent investigation methods for the spot welding strength. The first method welds the stacked edge portion of the two rectangular steel sheets followed by applying tensile forces in the directions along the surface planes of the two plates. The second method welds the crossed two rectangular steel sheets at crossing center followed by applying tensile forces in the directions rectangular to the surface plane of the two plates at both ends of each of the steel sheets. The first method is referred to as the TSS (Tensile Shear Strength) test, and the second method is referred to as the CTS (Cross Tension Strength) test.

Regarding a carbon steel excellent in both ductility and toughness, a dual-phase steel having fine crystal grains has been investigated, and the segregation of carbides at the grain boundary is known as an effective mean (Japanese Patent Laid-Open No. 2007-332457). Although the increased carbon content in the material is required to segregate carbides at the grain boundary, as high carbon content makes the spot welding zone too hard, the brittle spot welding zone cause a problem that the weld strength remarkably decreases. So, the carbon content is controlled to be about 0.15 mass % or less in the steel sheets for automobiles widely used.

Among the methods of spot welding the steel sheets, the method first conducting low-frequency electrical current application and then conducts the high-frequency electrical current application is known (WO 2011/013793).

Further, Japanese Patent No. 4006513 and the paper: Characterization of Microstructure for Tempered Martensite by Atomic Force Microscopy; Masao Hayakawa, Saburo Matsuoka, Materia Japan, Vol. 43, No. 9, pp. 717-723, 2004 disclose the method for evaluating the fine dual-phase microstructure of the high-strength steel by Atomic Force Microscopy (AFM). Note that the evaluated sample is the steel type of JIS-SCM440 with carbon content of 0.4% by mass.

SUMMARY OF THE INVENTION

Problems to be Solved by the Invention

Regarding the strength in the spot welding zone, with the increased tensile strength of a steel plate, the CTS first increase in proportion, but the CTS may decrease in a steel plate having a tensile strength of a certain value or more. The matter may be caused by the too much enhanced strength of the steel plate, the concentrated stress at the spot welding zone, or the poor toughness at the spot welding zone. So, just the spot welding on steel sheets low in carbon content has been investigated.

Means to Solve the Problem

An object of the present invention is to provide a welding method which recovers the strength of a spot welding zone, namely, the ductility and the toughness of the spot welding zone to prevent the fracture of the spot welding zone, and a weld structure manufactured by the method.

To achieve the object, the present invention employs the following characteristic means.

[1] A welding method, wherein a spot welding zone provided with a weld nugget is formed by conducting spot welding on the heat treated steel sheets in a stack;

the spot welding zone is tempering treated by the high-frequency electrical current application to make a hardness at the weld nugget 150% or less of the hardness of the heat treated steel sheets, and same time, to make a hardness at a heat affected zone surrounding the weld nugget 30% to 90% of the hardness at the weld nugget before the tempering treatment by the high-frequency electrical current application.

[2] The welding method according to [1], wherein a tensile strength of the heat treated steel sheets is 0.77 GPa to 2.0 GPa.

[3] The welding method according to [1], wherein the heat treated steel sheets are the quenching treated steel sheets elevated a temperature equal to or higher than the transformation temperature and cooled rapidly or a normalizing treated steel sheets.

[4] The welding method according to [1], wherein a carbon content of the steel sheets before the prior heat treatment is 0.15 mass % or more and 0.55 mass % or less.

[5] A weld structure manufactured by using the welding method according to [1].

[6] The weld structure according to [5], wherein the heat treated steel sheets are martensite transformed steel sheets or dual-phase transformed steel sheets composed of ferrite and perlite.

[7] The weld structure according to [5], wherein the hardness at the weld nugget in the spot welding zone is higher than the hardness at the heat affected zone surrounding the weld nugget.

Advantages of the Invention

As the present invention conduct the high-frequency electrical current application into the spot welding zone after finishing spot welding of the steel sheets increased in tensile strength by the prior heat treatment, heat transfer occurs along both directions from the heat affected zone in the spot welding zone toward inside, namely, toward the central portion of the spot welding zone, namely, the so-called weld nugget; and heat transfers from the heat affected zone in the spot welding zone toward outside, i.e. heat transfers toward both the central portion of the spot welding zone and outside of the spot welding zone. So, the central portion and the outside portion of the spot welding zone quenched in spot welding are tempering treated. As a result, the ductility and the toughness of the spot welding zone is recovered. As a results, as the hardness at the weld nugget, the central portion of the spot welding zone, is made 150% or less of the hardness of the heat treated steel sheets, and further the hardness at the heat affected zone surrounding the weld nugget, in particular, the corona bond which might be a fracture origin in the heat affected zone is 30% to 90% of the hardness at the weld nugget before the tempering treatment by the high-frequency electrical current application, the spot welding zone hardly fractures.

BRIEF DESCRIPTION OF THE DRAWINGS

FIG. 5 is a diagram schematically showing the cross section of a cruciform test piece manufactured by the welding method employing the condition shown in FIG. 1;

FIG. 6(a) is a diagram schematically showing the vertical cross section of a cruciform test piece, and FIG. 6(b) is a chart showing an example of the hardness distribution along the longitudinal cross sectional direction of the cruciform test piece of FIG. 6(a);

FIG. 10 is a diagram showing the evaluation results in Examples 1 to 3 and Comparative Examples 1 to 3;

DETAILED DESCRIPTION OF THE PREFERRED EMBODIMENTS

The embodiments of the present invention will be described with reference to the drawings. The welding method according to the present invention is characterized in that a spot welding zone provided with a weld nugget is formed by conducting spot welding on the heat treated steel sheets in a stack; the spot welding zone is tempering treated by the high-frequency electrical current application to make a hardness at the weld nugget 150% or less of the hardness of the heat treated steel sheets, and same time, to make a hardness at a heat affected zone surrounding the weld nugget 30% to 90% of the hardness at the weld nugget before the tempering treatment by the high-frequency electrical current application.

The carbon content of the steel sheets before the prior heat treatment to be welded according to the present invention is preferable to be 0.15 mass % or more and 0.55 mass % or less. If the carbon content of the steel sheets before the prior heat treatment is less than 0.15 mass %, as the quenching treatment hardly finish in the steel sheets, the steel sheets are hardly transformed into martensite in welding and the matter makes effects of the high-frequency electrical current application poor. Note that, steel sheets having a carbon content exceeding 0.55 mass % are not used in general.

Figure 1:
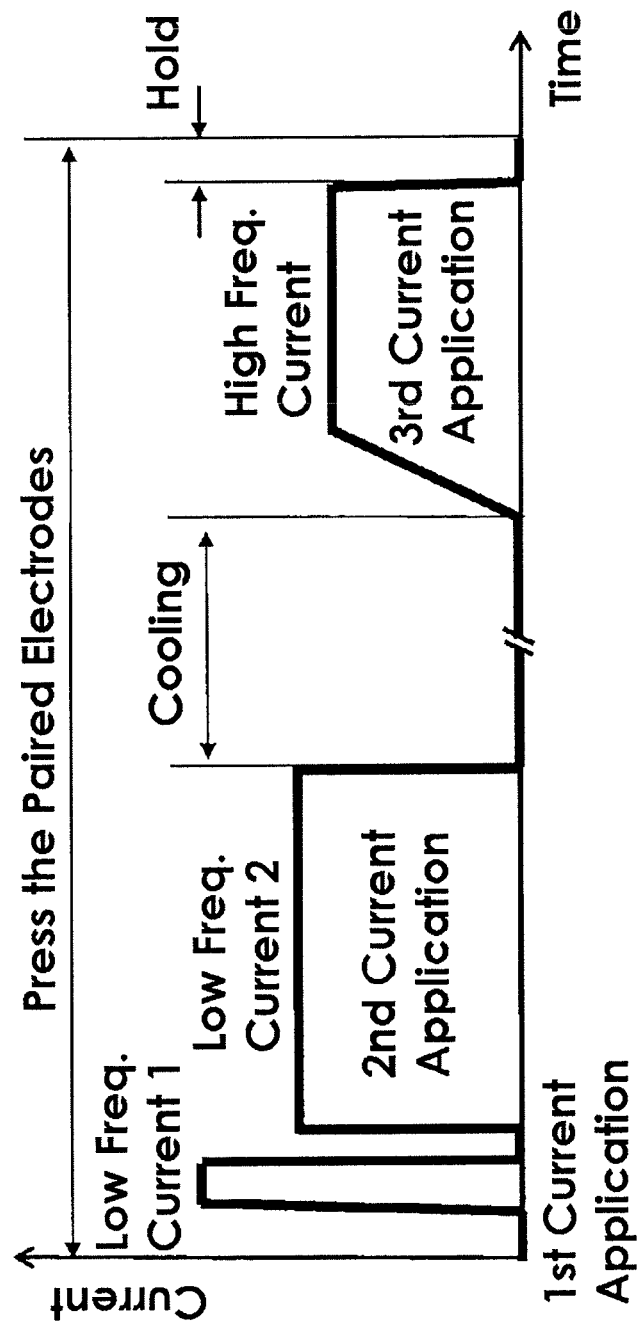
FIG. 1 is a chart showing the electrical current application sequence in the welding method according to an embodiment of the present invention.

The welding method according to the embodiment of the present invention in which steel sheets are stacked and spot welded will be described with reference to the electrical current application sequence shown in FIG. 1. The welding method of the present invention is constituted by the first to fourth steps.

First step: The first step is the pretreatment step of spot welding and conducts the prior heat treatment on steel sheets. The prior heat treatment as the pretreatment step may employ a quenching treatment, a normalizing treatment or other various heat treatments. If the prior heat treatment employs quenching treatment in the present invention, temperature of the steel sheets are elevated to a temperature equal to or higher than the transformation temperature followed by rapid cooling. Then, the steel sheets are tempering treated at a temperature equal to or lower than the transformation temperature for a relatively long period of time. The prior heat treatment employing quenching treatment transforms microstructure of the carbon steel into martensite.

If the prior heat treatment employs normalizing treatment in the present invention, temperature of the steel sheets elevate relatively slowly to a predetermined temperature and keep for a certain period of time. The prior heat treatment employing normalizing treatment transforms the microstructure of the carbon steel into a dual-phase microstructure composed of ferrite and perlite. As described above, the prior heat treatment employing quenching treatment or normalizing treatment enhances the tensile strength of the steel sheets to be 0.77 GPa to 2.0 GPa. The tensile strength of the heat treated steel sheets of 0.77 GPa or more and 2.0 GPa or less achieves the high strength and the weight reduction in the steel sheets while maintaining the ductility and the toughness in the steel sheets.

Second step: The second step stacks and spot welds a plurality of the steel sheets heat treated in the first step. In the spot welding, the heat treated steel sheets in a stack are sandwiched with a rod-like paired electrodes extending perpendicular to the steel sheets under pressure, and the steel sheets are welded by the electrical current application into the steel sheets. The electrical current may be a direct current or a low-frequency electrical current having frequency of the commercially available electric power supply. The spot welding may employ a conventional spot welding method. For example, the electrical current application may be conducted in two stages as shown in FIG. 1: "the first electrical current application" and "the second electrical current application". "The first electrical current application" conducted prior to "the second electrical current application" as the final welding removes the oxide scales on the heat treated steel sheets which disturb the spot welding to avoid poor welding. "The second electrical current application" applying electrical current for a longer time than in "the first electrical current application" forms a weld nugget (portion melted and solidified) between the steel sheets in a stack, a buckling and a concave region sandwiched by the rod-like paired electrodes.

Third step: The third step cools the weld nugget of the steel sheets spot welded by keeping for a predetermined cooling period while being sandwiched with the pair of upper and lower electrodes under pressure as it is. The cooling period is preferable to be 0.4 seconds to 1.0 second. This is because if the cooling period is less than 0.4 seconds, the spot welding zone cannot be cooled to a temperature lower than the temperature for martensite transformation (hereinafter referred to as "Ms-temperature"), and the transformation into the martensite microstructure high in ductility and toughness cannot be achieved after the tempering treatment of the spot welding zone by the high-frequency electrical current application in the subsequent fourth step. If the cooling period exceeds 1.0 second, the productivity is made poor. The Ms-temperature is determined depending on the steel plate composition, in particular, the percent-by-mass value of carbon. Further heating at the portion cooled to a temperature lower than the Ms-temperature in the subsequent fourth step transforms the portion into the martensite microstructure enhanced the ductility and the toughness. As the temperature of the spot welding zone is cooled to a temperature lower than the Ms-temperature in the present invention, the spot welding zone and the neighboring zone elevated temperature in the subsequent fourth step do not provide a temperature distribution that makes the hardness rapidly decreases and then increases again. So, the poor fracture mode or the less fracture strength in both the spot welding zone and the neighboring zone does not occur.

Figure 2:
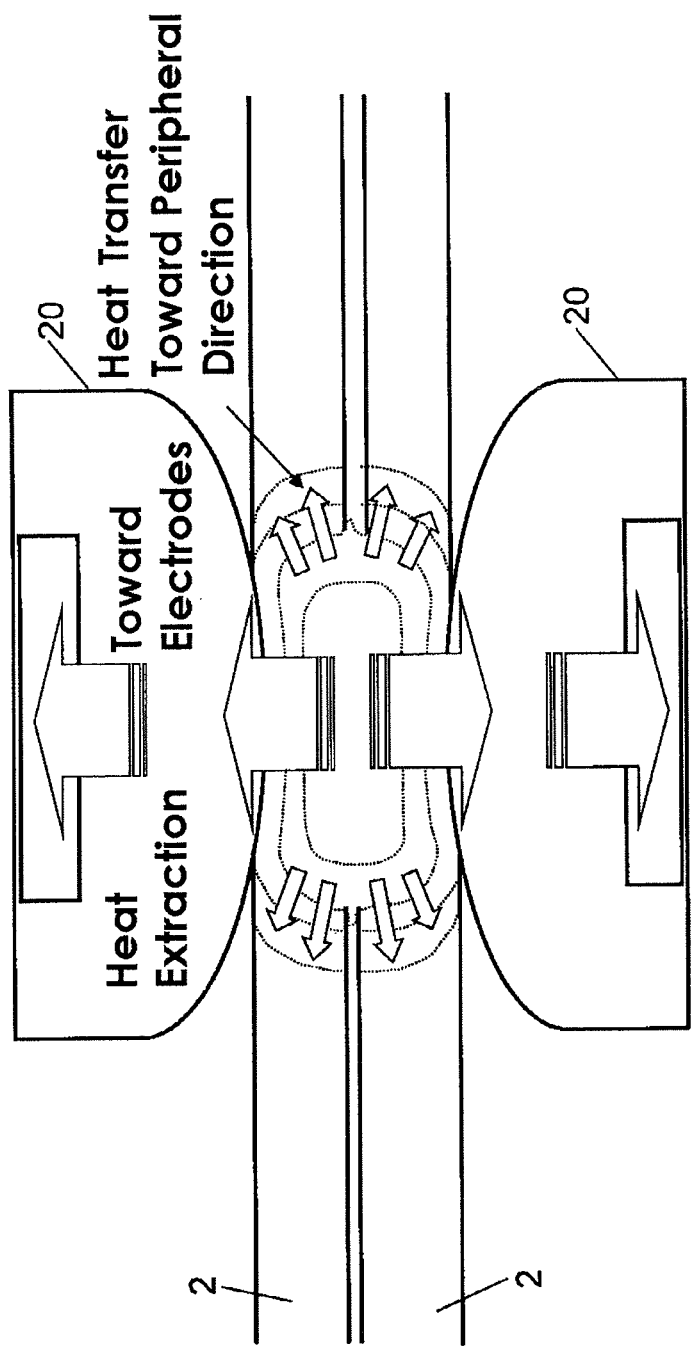
FIG. 2 is a diagram schematically illustrating mechanism of the cooling in the steel sheets in the cooling period of the third step.

FIG. 2 schematically shows the cooling mechanism of the steel sheets 2 in the cooling period in the third step. As shown in FIG. 2, it is preferable that the paired electrodes holding the concave region is water-cooled to efficiently cool the weld nugget from the central portion to the edge portion. If the cooling period in the third step is long, the central portion of the weld nugget is cooled to be the temperature below Ms-temperature quenching treats the spot welding zone to transforms the microstructure at the spot welding zone from the austenite to the martensite.

Fourth step: The fourth step applies the high-frequency electrical current across the paired electrodes holding the spot welded steel sheets after finishing the cooling period of the third step described above as "the third electrical current application" shown in FIG. 1. "The third electrical current application" is preferable to elevate temperature of the steel sheets to a temperature equal to or lower than the $A_{c1}$ transformation temperature by applying the high-frequency electrical current of 1-kHz to 50-kHz for 0.3 seconds to 1 second across the paired electrodes while holding the steel sheets under pressure. The time for electrical current application of the high-frequency electrical current of 0.3 seconds to 1.0 second enhances the strength of the spot welding zone because the corona bond is sufficiently elevated a temperature and tempering treated with a high production efficiency. After finishing the third electrical current application, the paired electrodes is made free from pressing. "The third electrical current application" forms a ring-shape heat accumulation region (hereinafter referred to as "the heat accumulation ring") in the outer peripheral portion of the weld nugget, and the heat transferred from the heat accumulation ring tempering treats the weld nugget that is surrounded by the heat affected zone (HAZ) and the heat accumulation ring.

Figure 3:
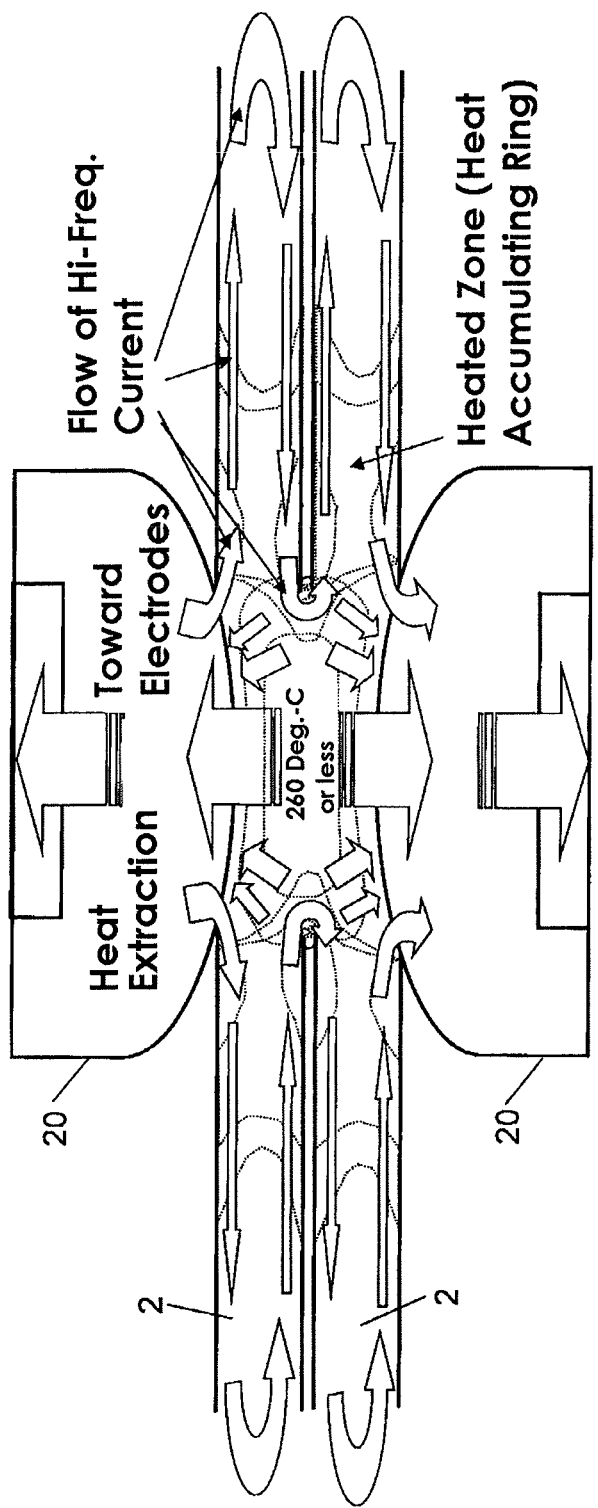
FIG. 3 is a diagram schematically illustrating mechanism of the heating in steel sheets by the high-frequency electrical current application.
Figure 4:
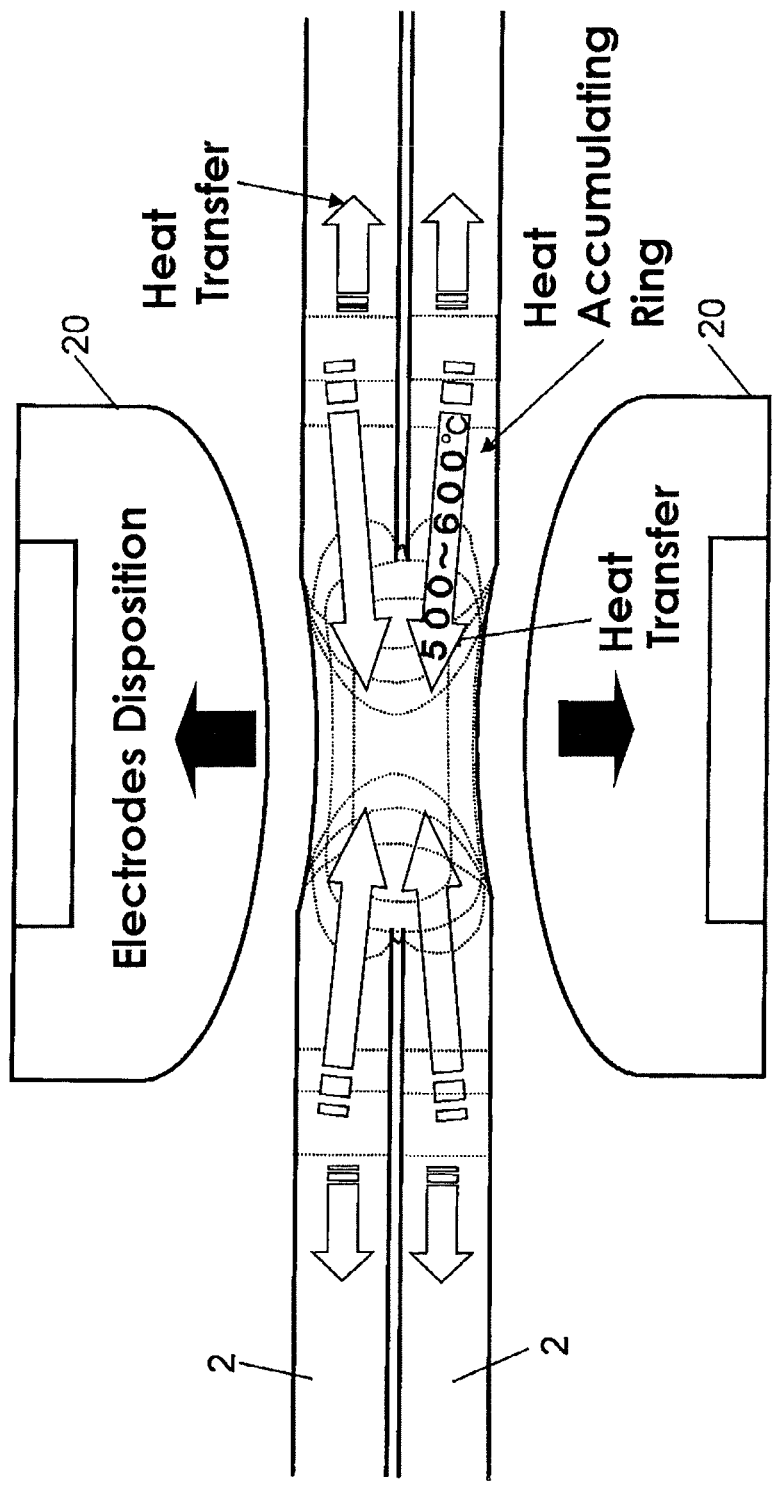
FIG. 4 is a diagram schematically illustrating mechanism of the tempering after the high-frequency electrical current application.

The heating mechanism of the steel sheets in "the third electrical current application" and the tempering mechanism after "the third electrical current application" will be described with reference to FIGS. 3 and 4. FIG. 3 is a diagram schematically illustrating the heating mechanism of the steel sheets in "the third electrical current application", and FIG. 4 is a diagram schematically illustrating the tempering mechanism after finishing "the third electrical current application". Although the low-frequency electrical current in "the first electrical current application" and "the second electrical current application" described above path through between the contact areas of the paired electrodes, the high-frequency electrical current in "the third electrical current application" flows through mainly surface layer of the steel plate around outside of the paired electrodes due to the skin effect as shown in FIG. 3. Then, the heat accumulation ring locally elevated a temperature is formed in the portion high in the magnetic flux density of the high-frequency electrical current. After finishing "the third electrical current application", the paired electrodes 20 is detached from the steel sheets 2, the steel sheets spot welded are made free from the pressure. With detachment of the paired electrodes 20, heat transfers from the heat accumulation ring formed in the outer peripheral portion of the weld nugget into the low temperature region at the central portion in the weld nugget, and the entire region has been sandwiched with the paired electrode 20 under pressure is uniformly elevated temperature to 500 deg.-C. to 600 deg.-C. The microstructure of the weld nugget is tempered by the heat transferred and transforms into the martensite excellent in the ductility and the toughness. In other words, the quenched spot welding zone in the weld nugget is tempering treated by the heat transferred from the heat accumulation ring.

That is, the high-frequency electrical current in the fourth step applied into the steel sheets spot welded does not flow in the direction along the axis of the rod-like paired electrodes 20 the same as in the step 2, but flows around outside of the paired electrodes due to the skin effect. So, heat transfers from the heat accumulation ring accumulating heat in a ring-shape into the low temperature region at the center of the weld nugget. As a result, the entire region where the paired electrodes sandwich is uniformly heated. In addition, heat transfers from the heat accumulation ring toward the outside of the weld nugget also. Thus, the heat affected zone which is the periphery of the weld nugget is also tempering treated, and the microstructure in periphery of the weld nugget transforms into the martensite excellent in ductility and toughness. In general, the corona bond formed in the heat affected zone surrounding the weld nugget tends to be a fracture origin. However, the tempering treatment by the high-frequency electrical current application makes a hardness at the weld nugget 150% or less of the hardness of the heat treated steel sheets, and same time, makes a hardness at a heat affected zone surrounding the weld nugget 30% to 90% of the hardness at the weld nugget before the tempering treatment by the high-frequency electrical current application. So, fracture hardly occur in the spot welding zone and at the boundary region between the spot welding zone and the non-welded zone.

The cruciform test piece spot welded a cross center of the two steel sheets by the welding method described above for CTS test will be described with reference to FIG. 5. FIG. 5 schematically shows the cross section of a cruciform test piece prepared by the welding condition described above. The cruciform test piece 1 is provided with a spot welding zone 13 and a non-weld zone 11 as shown in FIG. 5. The non-weld zone 11 maintains the microstructure of the heat treated steel sheets 2 formed in the first step. The spot welding zone 13 is provided with a weld nugget 13a, the heat affected zone 13b surrounding the weld nugget 13a, and the corona bond 13c formed in the heat affected zone 13b. The gap 14 exists at the boundary between the steel sheets 2 and 2 in the heat affected zone 13b.

The hardness distribution in the cruciform test piece 1 will be described with reference to FIG. 6. FIG. 6(a) is a diagram schematically showing the vertical cross section of a cruciform test piece extending from the center of the weld nugget to the end of the cruciform test piece, and FIG. 6(b) is a chart showing an example of the hardness distribution along the longitudinal direction of the cruciform test piece in FIG. 6(a). Arrows in FIG. 6(a) corresponds to the positions where the hardness in FIG. 6(b) was measured. In the cruciform test piece 1, the hardness at the weld nugget 13a is higher than the hardness at the heat affected zone 13b surrounding the weld nugget 13a, and is lower than the hardness at the non-weld zone 11 apart from the weld nugget 13a, namely, the hardness of the heat treated steel sheets 2 before welding. The broken line in FIG. 6(b) denotes the hardness of the steel plate before welding, and the hardness at the heat affected zone 13b is 150% or less of the hardness at the weld nugget 13a.

The hardness distribution in the cruciform test piece 1 depends on the microstructure distribution caused by the heat cycle, and the distribution of the hardness among the spot welding zone and the region other than the spot welding zone depends on the amount of the heat energy generated by the high-frequency electrical current application. The microstructure of the portion cooled in the third step to a temperature lower than the Ms-temperature is transformed into the martensite microstructure by the tempering treatment.

EXAMPLES

Example 1

The steel plate specimens for the welding test was prepared as described below. As the raw material, the carbon steer S45C was used. The chemical composition, the DI value, the carbon equivalent $C_{eq}$ and the tensile strength of the steel plate specimens for the welding test of the carbon steel are shown in Table 1. Note that, the DI value is the ideal critical diameter: a value obtained in accordance with A255 (Standard Test Method for Determining Hardenability of Steel) provided in ASTM (American Society for Testing and Materials) in the present Example. The carbon equivalent $C_{eq}$ is the carbon equivalent provided in JIS A 5523. The expression for determination of the carbon equivalent is shown below.

$$C_{eq} (\%) = C + Si/24 + Mn/6 + Ni/40 + Cr/5 + Mo/4 + V/14$$

TABLE 1

| Raw Material | Chemical composition (mass %) | | | | | DI value (mm) | Carbon equivalent $C_{eq}$ (%) | Tensile strength (GPa) |
|---|---|---|---|---|---|---|---|---|
| | C | Si | Mn | P | S | | | |
| S45C | 0.46 | 0.22 | 0.71 | 0.009 | 0.004 | 22.3 | 0.60 | 0.77 |

The test specimens prepared in Example were the steel sheets rectangular in the plain view, 150 mm in the length along the rolling direction, 50 mm in the width perpendicular to the rolling direction and 1.2 mm in thickness.

Figure 7:
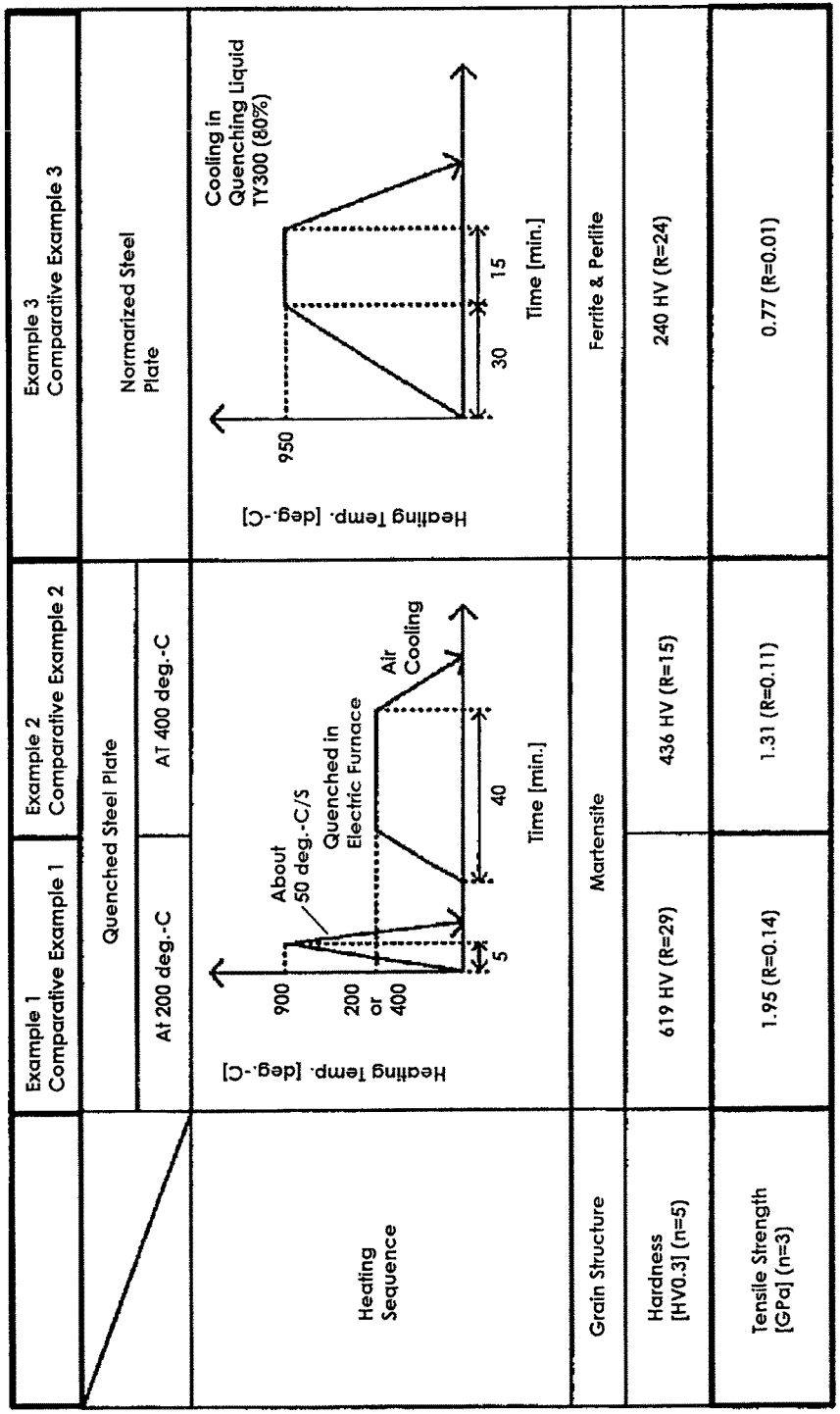
FIG. 7 is a diagram showing the heat cycle in the prior heat treatment, the microstructure, the hardness and the tensile strength of the steel plate specimens in Examples 1 to 3 and Comparative Examples 1 to 3.

Then, the steel plate specimens prepared were subjected to the prier heat treatment as the pretreatment step of the spot welding. FIG. 7 shows the heat cycle in the prior heat treatment of the steel plate specimens, the microstructure, the hardness and the tensile strength of the steel plate specimens in Examples 1 to 3 and Comparative Examples 1 to 3.

In Example 1, the steel plate specimens were elevated temperature to 900 deg.-C. in 5 minutes, and then quenching treated by rapid cooling at a rate of about 50 deg.-C./min as shown in FIG. 7. Then, the steel plate specimens were heated at a constant temperature of 200 deg.-C. for 40 minutes in an electric furnace, followed by air cooling for the tempering treatment.

In Example 1, the hardness and the tensile strength of the steel plate specimen after the prior heat treatment are 619 HV and 1.95 GPa. The microstructure observed was martensite. In FIG. 7, [HV0.3] is the Vickers hardness (0.3 kgf), n is the number of the measured points and R is a range, the difference between the maximum value and the minimum value in the measured values.

Then, two steel plate specimens after finishing the pretreatment step were stacked and were subjected to spot welding. To conduct a cruciform tensile test in Example 1, two steel plate specimen were stacked in a cross shape, sandwiched with rod-like water-cooled paired electrodes under a pressure of 4.5 kN. A spot welding followed by the tempering treatment was conducted with the electrical current application sequence shown in FIG. 8(a). The electrodes used are DR-type electrodes (DR40) having the diameter at the portion contact to the steel plate of 6.0 mm. Specifically, a low-frequency electrical current of 50-Hz increased from 0 A to 10 kA in 0.02 seconds was applied for 0.02 seconds. Then, after the delay time of 0.02 seconds, a constant electrical current of 8 kA was applied for 0.34 seconds. After the delay time of 1.0 second, the high-frequency electrical current of 25-kHz and power of 73 kW was applied to the paired electrodes, and the electrical current application was turned off after 0.9 seconds of the high-frequency electrical current application. Then, while the condition was being maintained as it was for 0.02 seconds, the pressure of 4.5 kN to the paired electrodes was released, and the paired electrodes were detached. Thus, the cruciform test piece in Example 1 was prepared. For evaluation, a cruciform tensile test was conducted to investigate the cross tension strength and the fracture mode.

Example 2

In Example 2, the steel plate specimens the same as in Example 1 were used. Example 2 is different from Example 1 in the tempering temperature using electric furnace in the heat cycle, a constant tempering temperature of 400 deg.-C. was employed as shown in FIG. 7. In Example 2, the hardness and the tensile strength of the heat treated steel plate specimen were 436 HV and 1.31 GPa. The microstructure observed was martensite. Two heat treated steel plate specimens were subjected to spot welding under the same conditions as in Example 1 to prepare a cruciform test piece, and the evaluation was conducted under the same manner as in Example 1. Note that, the pressure with the paired electrodes was 4.0 kN.

Example 3

In Example 3, the steel plate specimens the same as in Examples 1 were used. In the prior heat treatment of Example 3, a normalizing treatment different from Examples 1 and 2 was conducted. In Example 3, the steel plate specimens were elevated temperature linearly to 900 deg.-C. in about 30 minutes, were maintained at 900 deg.-C. for 15 minutes, and then were immersed into a quenching liquid in tank under stirring as shown in FIG. 7.

As shown in FIG. 7, the hardness and the tensile strength of the steel plate specimens after the prior heat treatment were 240 HV and 0.77 GPa in Example 3. The microstructure observed is a dual-phase microstructure composed of ferrite and perlite. Two heat treated steel plate specimens were subjected to spot welding under the same conditions as in Example 1 to prepare a cruciform test piece, and the evaluation was conducted under the same manner as in Example 1. Note that, the pressure with the paired electrodes was 4.0 kN.

Example 4

Example 4 is different from Example 3 only in the electric power in the high-frequency electrical current application. Specifically, the electric power in the high-frequency electrical current application was 38.7 kW-s in Example 4.

Example 5

Example 5 is different from Example 3 only in the electric power in the high-frequency electrical current application. Specifically, the electric power in the high-frequency electrical current application was 30.1 kW-s in Example 5.

OTHER EXAMPLES

Although, S45C was used as the raw material in preparation of the steel plate specimens for the welding test of the carbon steel in Examples 1 to 5, steel plate specimens using other raw materials, S15C in Example 6, S25C in Example 7, S35C in Example 8 and S55C in Example 9 were prepared also. Table 2 shows the chemical composition, the DI value, the carbon equivalent $C_{eq}$ and the tensile strength of the steel plate specimens.

TABLE 2

| Raw Material | Chemical composition (mass %) | | | | | DI value (mm) | Carbon equivalent $C_{eq}$ (%) | Tensile strength (GPa) |
| --- | --- | --- | --- | --- | --- | --- | --- | --- |
| | C | Si | Mn | P | S | | | |
| S15C | 0.15 | 0.26 | 0.43 | 0.008 | 0.010 | 8.6 | 0.23 | 0.46 |
| S25C | 0.26 | 0.26 | 0.43 | 0.009 | 0.011 | 11.3 | 0.34 | 0.52 |
| S35C | 0.35 | 0.25 | 0.75 | 0.009 | 0.010 | 18.6 | 0.49 | 0.61 |
| S55C | 0.55 | 0.25 | 0.75 | 0.008 | 0.011 | 23.3 | 0.69 | 0.83 |

The steel plate specimens in Examples 6 to 9 prepared by using the raw materials described above were subjected to a normalizing treatment in the same manner as in Example 3. Then, the steel plate specimens were stacked and subjected to spot welding, followed by conducting the tempering treatment by the high-frequency electrical current application. The pressure with the paired electrodes in the spot welding were 2.5 kN in Example 6, 3.0 kN in Example 7 and 4.0 kN in Examples 8 and 9. The first electrical current applications in the spot welding were conducted with 10.0 A in any of Examples 6 to 9. The second electrical current application conducted in the spot welding were 8.5 A in Example 8, and 8.0 A in Examples 6, 7 and 9. The spot welding conditions other than the conditions described above were the same as in Example 3 in preparation of the cruciform test piece and the evaluation was conducted under the same manner as in Example 1. The electric powers in the tempering treatment by the high-frequency electrical current application were 21.5 kW-s in Example 6, 30.1 kW-s in Example 7, 38.7 kW-s in Example 8 and 65.7 kW-s in Example 9. The application times of the electric power in the high-frequency electrical current application were 0.5 to 0.9 seconds, and were regulated in consideration of the electric power.

COMPARATIVE EXAMPLES

Comparative Example 1

Figure 8:
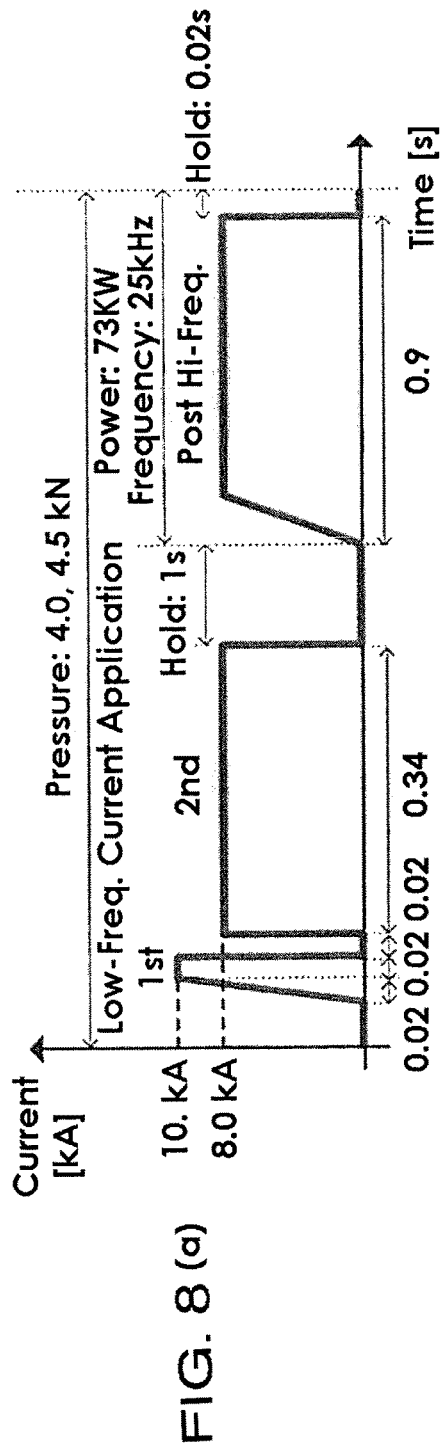
FIG. 8(a) is a chart showing the electrical current application sequence in Examples 1 to 3, and FIG. 8 (b) is a chart showing the electrical current application sequence in Comparative Examples 1 to 3.
Figure 8:
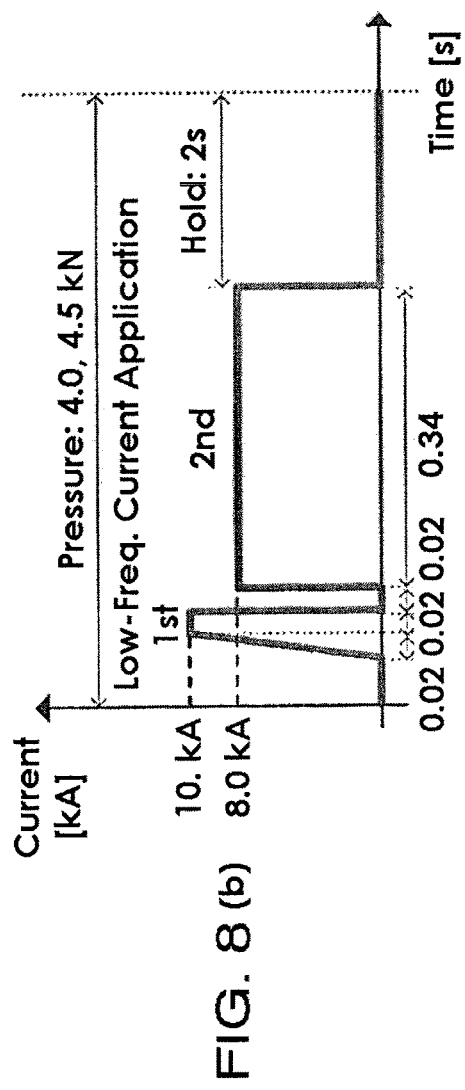

In Comparative Example 1, two heat treated steel plate specimens the same as in Example 1 were used. Then, the two heat treated steel plate specimens were stacked in a cross shape and were sandwiched with rod-like water-cooled paired electrodes under a pressure of 4.5 kN. Then, a low-frequency electrical current application of 50-Hz was increased from 0 A to 10 kA in 0.02 seconds, and then a constant electrical current of 10 kA was applied for 0.02 seconds as shown in FIG. 8(b). After the delay time of 0.02 seconds, a constant electrical current of 8 kA was applied for 0.34 seconds. Then, while the pressure was being maintained as it was for 2.0 seconds, the pressure of 4.5 kN with the paired electrodes was released, and the paired electrodes were detached. The prepared cruciform test piece was evaluated in the same manner as in Example 1.

Comparative Example 2

In Comparative Example 2, two heat treated steel plate specimens the same as in Example 2 were used. Then, a cruciform test piece was prepared in the same manner as in Comparative Example 1. The prepared cruciform test piece was evaluated in the same manner as in Example 1.

Comparative Example 3

In Comparative Example 3, two heat treated steel plate specimens the same as in Example 3 were used. Then, a cruciform test piece was prepared in the same manner as in Comparative Examples 1 and 2. The prepared cruciform test piece was evaluated in the same manner as in Example 1. (Comparison Among Examples 1 to 3 and Comparative Examples 1 to 3)

Figure 9:
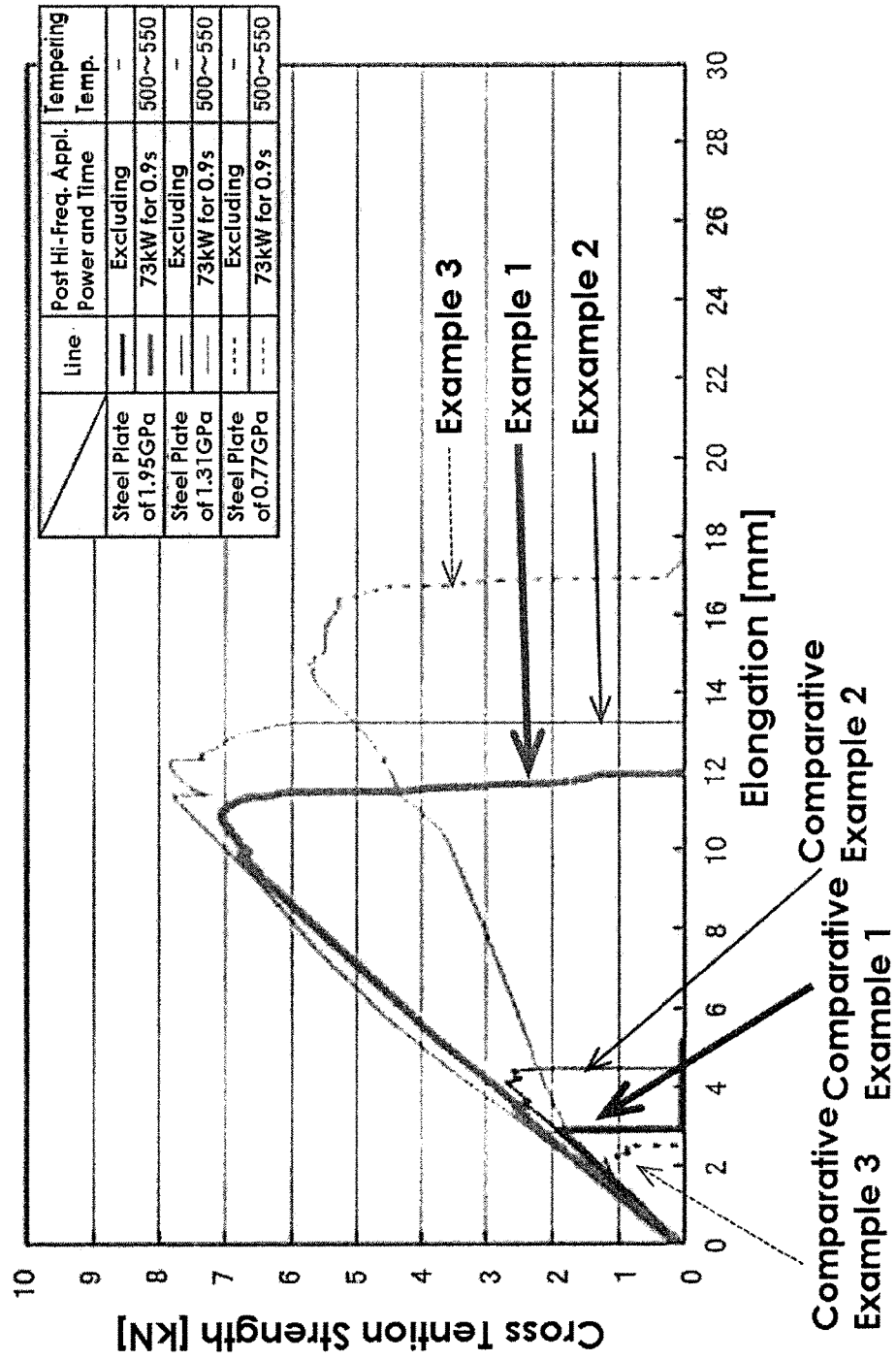
FIG. 9 is a chart showing the load-stroke curves in the CTS measurement.

The evaluation results of Examples 1 to 3 and Comparative Examples 1 to 3 will be described. FIG. 9 shows the load-stroke curves in the measurement of the CTS. In FIG. 9, the X-axis represents the stroke (mm), and the Y-axis represents the cross tension strength (kN). FIG. 10 shows the cross tension strengths determined from the curves shown in FIG. 9. FIG. 10 also shows the observed photo image at the weld nuggets in the cruciform test piece prepared after CTS measurement in Examples 1 to 3 and Comparative Examples 1 to 3.

As shown in FIG. 10, the average value of the cross tension strengths in the cruciform test piece prepared is 7.55 kN in Example 1, 8.24 kN in Example 2, and 5.73 kN in Example 3. The average value of the cross tension strength in the cruciform test piece prepared is 1.94 kN in Comparative Example 1, 2.61 kN in Comparative Example 2 and 1.21 kN in Comparative Example 3. That is, the average value of the cross tension strength in the cruciform test piece prepared in Examples are three times to five times of the average value of the cross tension strength in Comparative Examples. Also, from the observed photo image at the weld nuggets, the fracture modes in Examples 1 to 3 are all plug failure, but the fracture modes in Comparative Examples 1 to 3 are partial plug failure or interface fracture.

Figure 11:
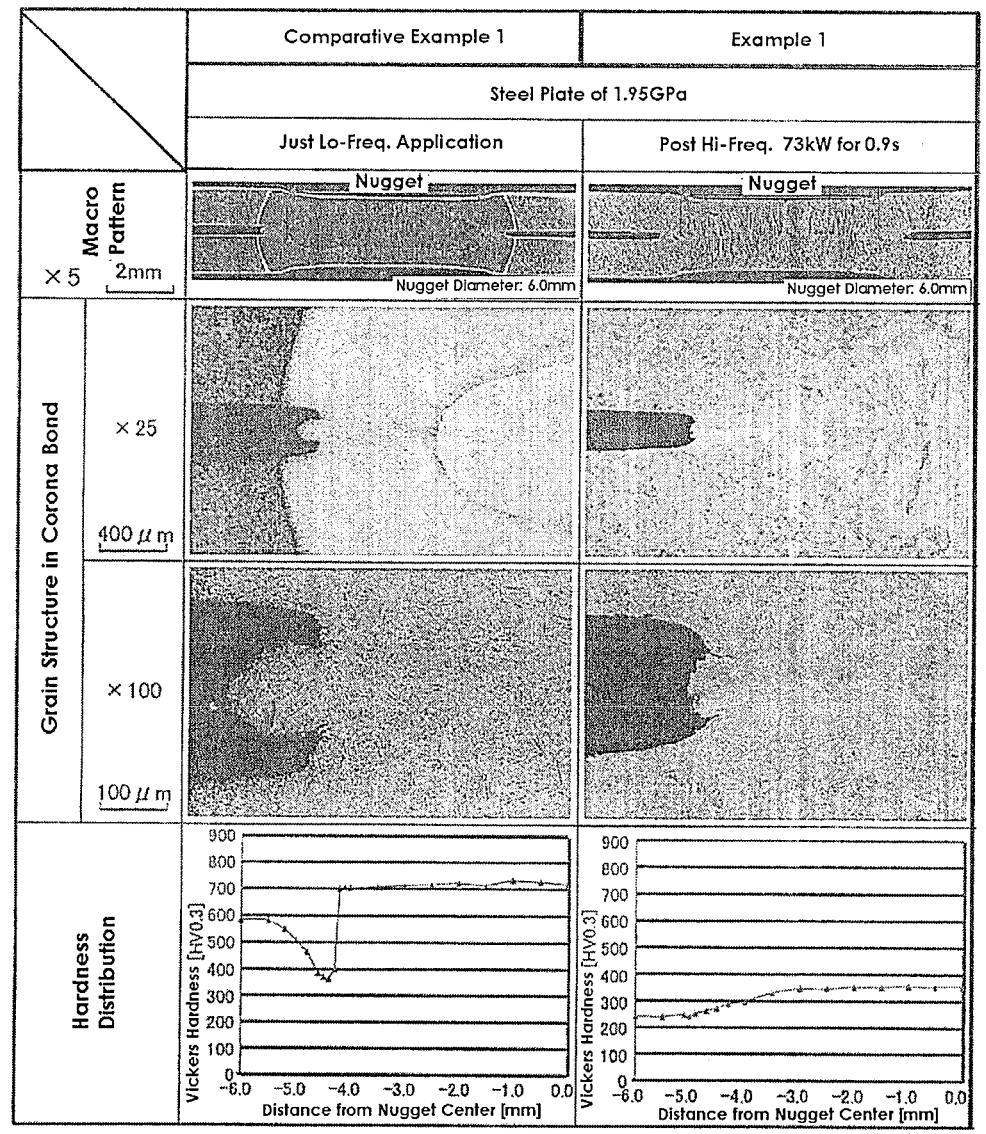
FIG. 11 is a diagram summarized the observed images of the macro patterns and the microstructures in the corona bonds; and the charts showing the hardness distributions among the evaluation results of Example 1 and Comparative Example 1.
Figure 12:
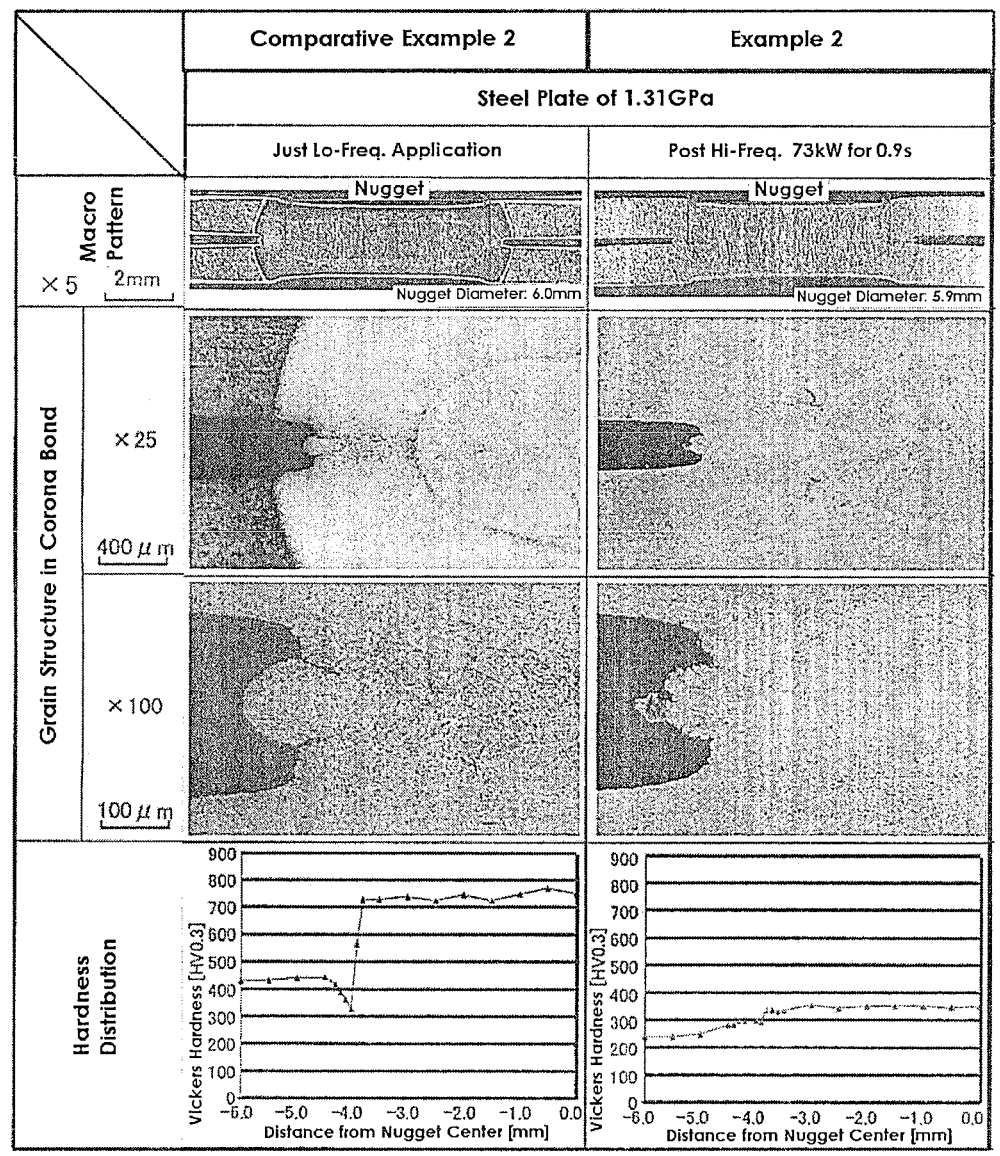
FIG. 12 is a diagram summarized the observed images of the macro patterns and the microstructures in the corona bonds; and the charts showing the hardness distributions among the evaluation results of Example 2 and Comparative Example 2.
Figure 13:
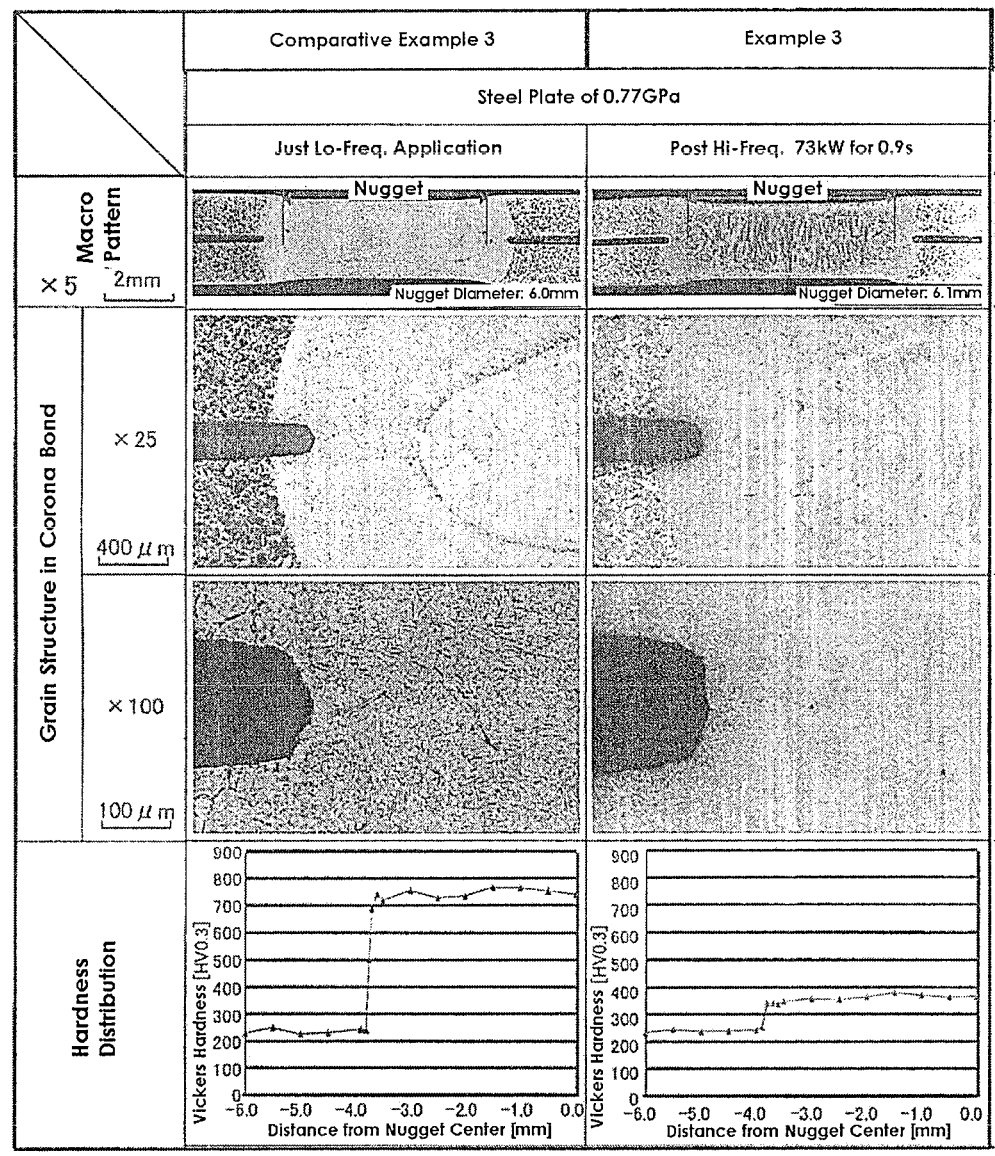
FIG. 13 is a diagram summarized the observed images of the macro patterns and the microstructures in the corona bonds; and the charts showing the hardness distributions among the evaluation results of Example 3 and Comparative Example 3.

FIGS. 11 to 13 show the observed photo images of microstructure at the macro patterns and the corona bonds, and the charts show the hardness distributions. As is obvious in the observed photo images of microstructure at the macro patterns and of the corona bonds in FIGS. 11 to 13, the boundaries between the weld nugget and the heat affected zone are clearly observed in Comparative Examples 1 to 3. However, the boundaries between the weld nugget and the heat affected zone are not clear in Examples 1 to 3.

If the hardness distributions in Comparative Examples 1 and 2 are investigated in the lengthwise direction of the cruciform test piece at a position about 0.1 mm far from the spot weld central axis of the two steel plate specimens, the hardness at the weld nugget is different from the hardness at the heat affected zone. The hardness at the portions not conducted both the spot welding and the tempering treatment by the high-frequency heating are about 600 HV in Comparative Example 1 and 430 HV in Comparative Example 2. In contrast, the hardness at the portions conducted the spot welding (the weld nuggets) in Comparative Examples 1 and 2 are both about 700 HV or more and almost constant. However, the HAZ softened layers decreased in hardness exist in the boundary regions between the welded portion and the portion not affected by welding.

On the other hand, in the cruciform test piece prepared in Example 1 in which the heat treated steel plate specimens are spot welded followed by the tempering treatment by the high-frequency electrical current application, the hardness at the weld nugget 13a of the spot welding zone 13 is about 360 HV as indicated by a solid line in FIG. 11. The hardness at the weld nugget after the tempering treatment by the high-frequency electrical current application is about 70% of the hardness 619 HV, hardness of the heat treated steel plate specimens before the spot welding. In the cruciform test piece prepared in Example 2 in which the heat treated steel plate specimens are spot welded followed by the tempering treatment by the high-frequency electrical current application, the hardness at the weld nugget 13a of the spot welding zone 13 is about 350 HV as indicated by a solid line in FIG. 12. The hardness at the weld nugget after the tempering treatment by the high-frequency electrical current application is about 97% of the hardness 436 HV, hardness of the heat treated steel plate specimen before the spot welding. In Examples 1 and 2, the hardness at the weld nugget 13a of the spot welding zone 13 are lower than the hardness of the heat treated steel plate specimen.

The hardness at the heat affected zone 13b surrounding the weld nugget 13a is about 280 HV to 350 HV in Example 1. In Comparative Example 1 in which the same conditions as in Example 1 except the tempering treatment by the high-frequency electrical current application was employed, i.e. the tempering treatment was conducted only by low-frequency electrical current application in the spot welding, the hardness at the weld nugget 13a is about 700 HV. So, the hardness at the heat affected zone 13b in Example 1 is 40% to 50% of the hardness at the weld nugget 13a in Comparative Example 1 in which the tempering treatment by the high-frequency electrical current application was not conducted. The hardness at the heat affected zone 13b surrounding the weld nugget 13a in Example 2 is about 280 HV to 350 HV. In Comparative Example 2 in which the same conditions as in Example 2 except the tempering treatment by the high-frequency electrical current application was employed, i.e. the tempering treatment was conducted only by low-frequency electrical current application in the spot welding, the hardness at the weld nugget 13a is around 750 HV. So, the hardness at the heat affected zone 13b in Example 2 is 37% to 47% of the hardness at the weld nugget 13a in Comparative Example 2 in which the tempering treatment by the high-frequency electrical current application was not conducted.

On the other hand, in Example 3 in which the steel plate specimens heat treated by normalizing treatment was spot welded followed by the tempering treatment by the high-frequency electrical current application, the hardness at the weld nugget 13a of the spot welding zone 13 is about 350 HV as indicated by a solid line in FIG. 13. The hardness at the weld nugget after the tempering treatment by the high-frequency electrical current application in Example 3 is about 146% of the hardness 240 HV of the heat treated steel plate specimen before the spot welding. The hardness at the heat affected zone 13b surrounding the weld nugget 13a in Example 3 is about 240 HV to 350 HV. In Comparative Example 3 in which the same conditions as in Example 3 except the tempering treatment by the high-frequency electrical current application was employed, i.e. the tempering treatment was conducted only by low-frequency electrical current application in the spot welding, the hardness at the weld nugget 13a is around 730 HV. So, the hardness at the heat affected zone 13b in Example 3 is 33% to 48% of the hardness at the weld nugget 13a in Comparative Example 3 in which the tempering treatment by the high-frequency electrical current application was not conducted.

In comparison among Examples 1 to 3 and Comparative Examples 1 to 3, the matter is made obvious that the welding method according to the present invention recovers the ductility and the toughness and makes the spot welding zone hardly fracture because the steel sheets relatively high in carbon proportion are heat treated and are conducted the spot welding and then tempering treated.

(Comparison among Examples 3 to 5 and Comparative Example 3)

In comparison between Example 3 and Comparative Example 3, the matter is made obvious that the tempering treatment by the high-frequency electrical current application increases the CTS and achieves plug failure in the cruciform tensile test. Then, the cross tension strength in relation to the electric power in the high-frequency electrical current application will be investigated with reference to Examples 3 to 5 and Comparative Example 3. The cross tension strengths were determined from the load-stroke curves in Example 3 to 5 and Comparative Example 3 in the same manner as determined in FIG. 9. The average value of the cross tension strengths in Example 4 is 5.7 kN, and the average value of the cross tension strengths in Example 5 is 5.4 kN. So, the matter is made obvious that the decrease of the electric power from 65.7 kW-s to 38.7 kW-s or 30.1 kW-s changes the cross tension strength little, i.e. the high-frequency electrical current application low in electric power achieves the tempering treatment. The observation of failed weld nuggets shows that the fracture modes in Examples 4 and 5 are plug failure.

(Evaluation Results in Examples 6 to 9)

In Examples 6 to 9, the hardness distribution was investigated in the same manner as in Examples 1 to 5. As a result, the matter was made obvious that the partial tempering effect of the high-frequency electrical current application decreases the hardness at both the weld nugget and the corona bond as compared with the hardness at the non-welded portion: the heat treated steel plate, in any of steel plate specimens different in carbon content. The degree of the decrease increases as the electric power of the high-frequency electrical current application increases, namely, as the electric power and/or the electrical current application time increases.

Figure 14:
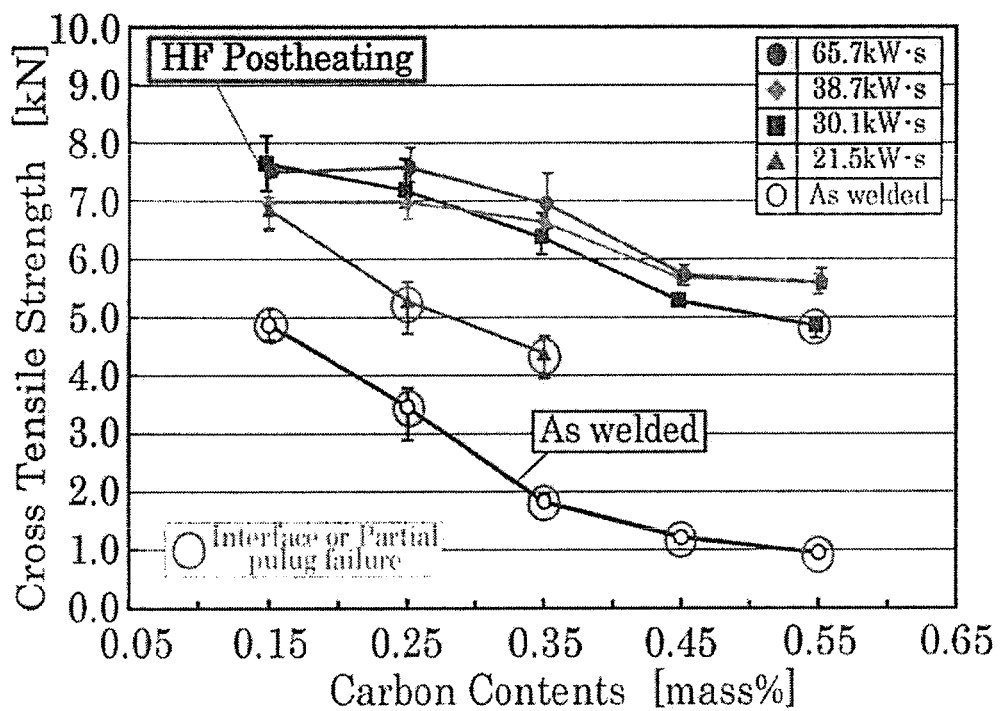
FIG. 14 is a chart showing the relation between carbon content and CTS for each electric power in the high-frequency electrical current post heating.

The dependence of the CTS upon carbon content against the electric power by time in the high-frequency electrical current application as a parameter will be described with reference to FIG. 14. In FIG. 14, the X-axis represents the carbon content (mass %) and the Y-axis represents the CTS (kN). In FIG. 14, the solid black circle (●) denote to the electric powers of the high-frequency electrical current application of 65.7 kW-s, the solid black rhombus (♦) denote to the electric powers of the high-frequency electrical current application of 38.7 kW-s, the solid black square (■) denote to the electric powers of the high-frequency electrical current application of 30.1 kW-s and the solid black triangle (▲) denote to the electric powers of the high-frequency electrical current application of 21.5 kW-s. The open black circle (○) denotes the case without the tempering treatment by the high-frequency electrical current application. The plotted values are an average of the data measured on a plurality of prepared samples, and the vertical bars (show the range. Note that, the plots surrounded by the open black circle represent the interface fracture or the partial plug failure in each of the plots.

If the tempering treatment by the high-frequency electrical current application is not conducted, the increase of the carbon content results significant decrease in the CTS from about 5 kN to about 1 kN as shown in FIG. 14. The fracture modes are not plug failure because either are the interface fracture or the partial plug failure.

However, if the tempering treatment is conducted by the high-frequency electrical current application, even if the carbon content is 0.20 mass % or more, namely, 0.26 mass %, 0.35 mass %, 0.46 mass %, and 0.55 mass %, these all being 0.25 mass % or more, the CTS should be 5.0 kN or more. Further, with the increased electric power, plug failure within a sound weld nugget occurs.

As described above, if the tempering treatment by the high-frequency electrical current application is not conducted, the fracture strength significantly decreases at the carbon content of 0.35 mass %. In contrast, if the tempering treatment by the high-frequency electrical current application is conducted, the decrease in the fracture strength is relatively small even if the carbon content increases. Thus, in comparison between the case where the tempering treatment by the high-frequency electrical current application is conducted and the case where no tempering treatment by the high-frequency electrical current application is conducted, the fracture strength is only 1.5 to 2 times in the steel plate having the carbon contents of 0.25 mass % or less, but the fracture strength is 3 to 5 times in the steel plate having the carbon contents of 0.35 mass % or more.

So, the present invention increases the strengths of the cruciform test pieces using the carbon steels medium to high in carbon content, and up the level of the available strength of steel sheets high in tensile strength.

The embodiments of the present invention is not limited to the matters described above and may be appropriately modified. The lower electric power in the high-frequency electrical current application than the electric powers in Examples may make practical manufacturing lines feasible.

INDUSTRIAL APPLICABILITY

The welding method according to the present invention recovers the ductility and the toughness in the spot welding zone to make the spot welding zone hardly fracture regardless of the carbon content. So, carbon steels medium to high in carbon content that have not been investigated as the members for spot welding are used as the members for spot welding.

SYMBOL LIST

1 Cruciform test piece
2 Steel plate
11 Non-welded zone
11 Spot welding zone
13a Portion melted and solidified (weld nugget)
13b Heat affected zone (HAZ)
13c Corona bond
14 Gap
20 Electrode

The invention claimed is:
1. A welding method comprising:
   forming a spot welding zone provided with a weld nugget formed by conducting spot welding on heat-treated steel sheets in a stack, by applying a pair of electrodes on opposite sides of the steel sheets in the stack at the welding zone;
   after forming the spot welding zone, cooling the spot welding zone for a cooling period of 0.4 seconds to 1.0 second while the pair of electrodes are applied at the spot-welding zone; and
   after the cooling period, tempering treating the spot welding zone by applying a high-frequency electrical current for a period of 0.3 seconds to 1.0 second across the pair of electrodes while holding the steel sheets under pressure,
   forming a hardness at the weld nugget of 150% or less of a hardness of the heat-treated steel sheets; and
   at the same time, forming a hardness at a heat affected zone surrounding the weld nugget being 30% to 90% of a hardness at the weld nugget before the tempering treatment by the high-frequency electrical current application.

2. The welding method according to claim 1, wherein:
a tensile strength of the heat-treated steel sheets is 0.77 GPa to 2.0 GPa.

3. The welding method according to claim 1, wherein:
the heat-treated steel sheets are quenching treated steel sheets elevated to a temperature equal to or higher than a transformation temperature and cooled rapidly, or are normalizing treated steel sheets.

4. The welding method according to claims 1, wherein:
the heat-treated steel sheets are steel sheets subjected to a heat treatment; and a carbon content of the steel sheets before the heat treatment is 0.15 mass % or more and 0.55 mass % or less.

\* \* \* \* \*